United States Patent
Fleming et al.

(10) Patent No.: US 7,971,027 B2
(45) Date of Patent: Jun. 28, 2011

(54) MARK PAGE-OUT PAGES AS CRITICAL FOR COOPERATIVE MEMORY OVER-COMMITMENT

(75) Inventors: Matthew D. Fleming, Austin, TX (US); David A. Hepkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/135,286

(22) Filed: Jun. 9, 2008

(65) Prior Publication Data

US 2009/0307462 A1    Dec. 10, 2009

(51) Int. Cl.
*G06F 12/06* (2006.01)
(52) U.S. Cl. .................... 711/203; 711/E12.008
(58) Field of Classification Search .............. 711/203, 711/202, 209, 170, E12.08, E12.095
See application file for complete search history.

(56) References Cited

U.S. PATENT DOCUMENTS

| | | | |
|---|---|---|---|
| 5,715,420 A | 2/1998 | Kahle et al. | |
| RE36,462 E | 12/1999 | Chang et al. | |
| 6,067,607 A | 5/2000 | Maegawa et al. | |
| 6,530,077 B1 | 3/2003 | Marsh | |
| 6,785,278 B1 | 8/2004 | Calvignac et al. | |
| 7,000,051 B2 | 2/2006 | Armstrong et al. | |
| 7,370,160 B2 | 5/2008 | Neiger et al. | |
| 7,624,240 B1 * | 11/2009 | Colbert et al. | 711/159 |
| 7,747,838 B2 * | 6/2010 | Hepkin et al. | 711/209 |
| 2007/0005870 A1 | 1/2007 | Neiger et al. | |
| 2009/0307377 A1 * | 12/2009 | Anderson et al. | 710/3 |

* cited by examiner

*Primary Examiner* — Pierre-Michel Bataille
(74) *Attorney, Agent, or Firm* — Robert C. Rolnik; David A. Mims

(57) ABSTRACT

Disclosed is a computer implemented method and apparatus for marking as critical a virtual memory page in a data processing system. An operating system indicates to a virtual memory manager a virtual memory page selected for paging-out to disk. The operating system determines that the data processing system is using a cooperative memory over-commitment. The operating system, responsive to a determination that the data processing system is using cooperative memory over-commitment, marks the virtual memory page as critical, such that the virtual memory page remains in physical memory. The operating system, responsive to marking the virtual memory page as critical, sets the virtual memory page to a page-out state.

21 Claims, 4 Drawing Sheets

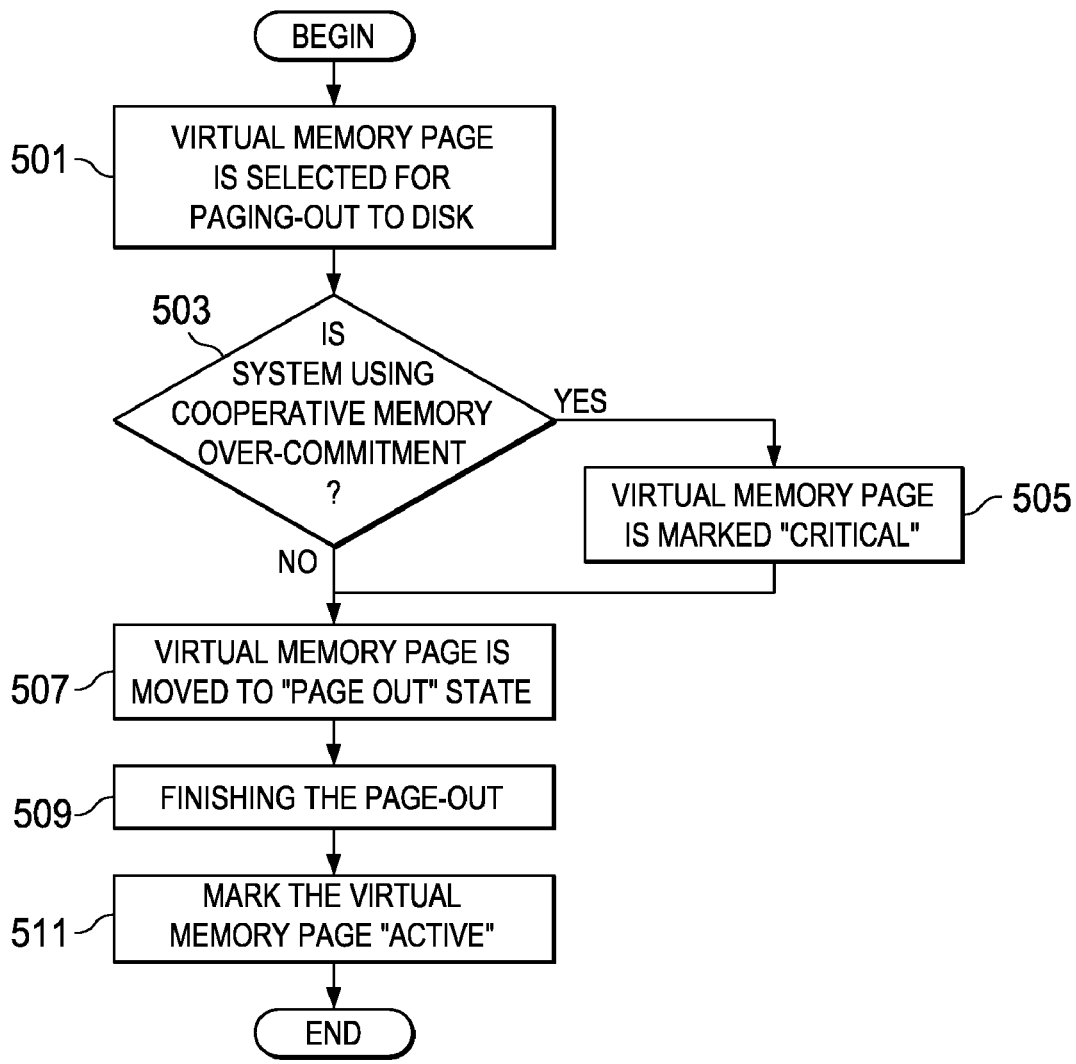

MARK PAGE-OUT PAGES AS CRITICAL FOR COOPERATIVE MEMORY OVER-COMMITMENT

CROSS REFERENCE TO RELATED APPLICATIONS

This application is related to commonly assigned and U.S. patent application Ser. No. 12/135,012 entitled "SELECTIVELY MARK FREE FRAMES AS UNUSED FOR COOPERATIVE MEMORY OVER-COMMITMENT," filed on even date herewith and hereby incorporated by reference.

BACKGROUND OF THE INVENTION

1. Field of the Invention

The present invention relates generally to a computer implemented method, data processing system, and computer program product for efficient use of volatile or physical memory. More specifically, the present invention relates to bringing into physical memory, or preventing the transferring from physical memory, the residency of a virtual memory page ahead of a flush operation.

2. Description of the Related Art

Designers of modern computers rely on two or more classes of workspace or addressing space (memory or storage). A first class of workspace is fast but relatively expensive. A second class of workspace is relatively slow, but cheaper than the first class of workspace. The first class of workspace can be volatile memory such as random access memory (RAM), while the second class of workspace can be a block storage device such as a disk drive. Frequently, there may be ten or more times as much of the second class of workspace available as compared to the first class in a typical computer system.

In order to operate efficiently, a system, as described above, moves instructions and data from the second class of workspace to the first class of workspace before a system processor operates on such instructions or data. A scheme to address memory within both classes of workspace is called virtual memory. Such an addressing scheme provides for a range of addresses larger than the addressable physical memory. Accordingly, a virtual memory 'page' can be actually stored to either physical memory or to storage, which correspond to the first class of workspace and the second class of workspace, respectively. Nevertheless, such virtual memory pages, if in the second class of workspace, must be marked as such, within a table, and then transferred to physical memory when accessed by the processor. The handling and manipulating of a virtual memory pages, a computer resource, is done through a virtual memory manager sub-component to a hypervisor. A hypervisor assigns resources to logical partitions.

Transferring data between storage and physical memory can be an expensive operation since the transfer is protracted, as compared to moving data between physical memories. Accordingly, benefits may be achieved if such transfers are minimized.

A virtual memory page is a fixed-size block of data. A virtual memory page can be resident in memory. Such a virtual memory page is mapped to a location where the physical data is stored in physical memory. Otherwise, a virtual memory page can be resident on a disk or other block device. In other words, the virtual memory page is paged out of physical memory, and instead, placed into paging space or a file system.

Accordingly, a virtual memory page can be an abstraction of memory storage that decouples the physical media from the operating characteristics of the virtual memory page as used within an operating system (OS). Such physical media is where the virtual memory page resides. The physical media is any storage mechanism, for example, random access memory, disk storage, tape storage, and flash memory, among others.

SUMMARY OF THE INVENTION

The present invention provides a computer implemented method and apparatus to for marking as critical a virtual memory page in a data processing system. An operating system indicates to a virtual memory manager a virtual memory page selected for paging-out to disk. The operating system determines that the data processing system is using a cooperative memory over-commitment. The operating system, responsive to a determination that the data processing system is using cooperative memory over-commitment, marks the virtual memory page as critical, such that the virtual memory page remains in physical memory. The operating system, responsive to marking the virtual memory page as critical, sets the virtual memory page to a page-out state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A is a flowchart of steps of an operating system to mark a virtual memory page as critical in accordance with an illustrative embodiment of the invention.

DETAILED DESCRIPTION OF THE PREFERRED EMBODIMENT

Figure 1:
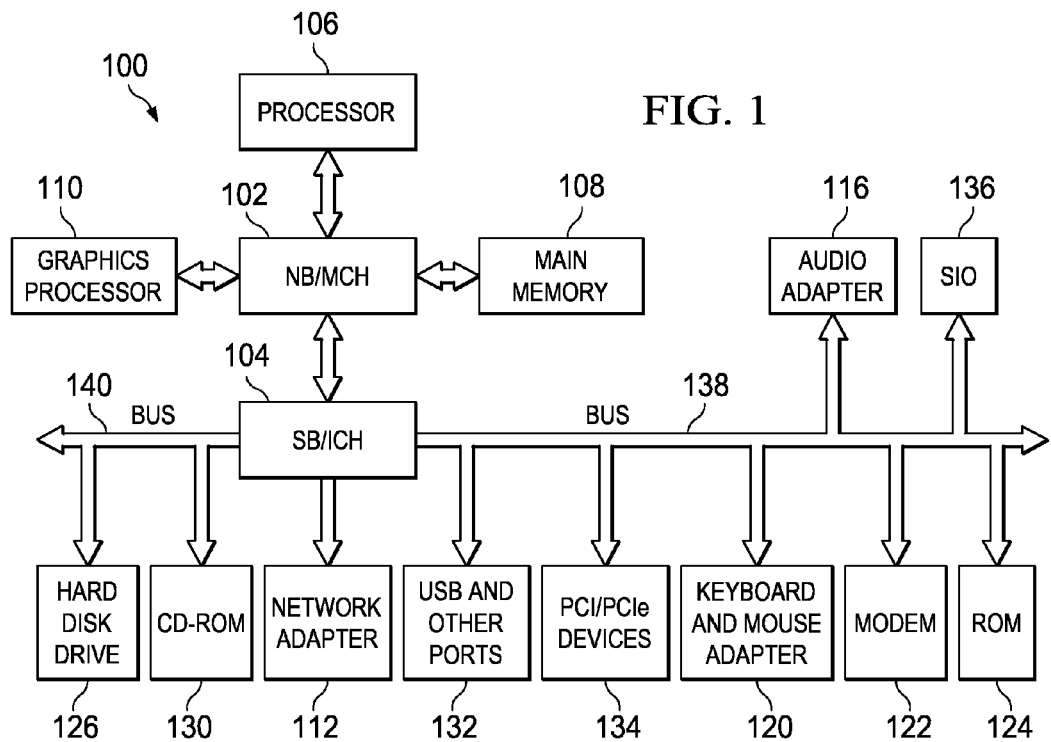
FIG. 1 is block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system, such as described in FIG. 1, may rely on distinct software modules that are executed in processor 106, and rely upon code that may be stored within memory or a hard disk drive, such as, for example, main memory 108 and hard disk drive 126, respectively. Software modules can be a virtual machine monitor or hypervisor, and one or more operating systems or logical partitions. Accordingly, the term virtual machine monitor performs the general functions of allocating resources, and as such, is sometimes called a hypervisor. But, the term virtual memory manager, is a component of the hypervisor, not to be confused with the term virtual machine monitor.

The illustrative embodiments provide an operating system or logical partition that may react to a determining step. The determining step can be determining that a virtual memory page is selected to be paged-out by an operating system. The reaction or response of the operating system can be to follow with a step of elevating the affected virtual memory page to 'critical' status. Accordingly, the cooperative operation of the virtual memory manager and operating system may avoid paging-out the virtual memory page to the hypervisor swap-space ahead of the initiation of the operating system paging-out the virtual memory page.

Figure 2:
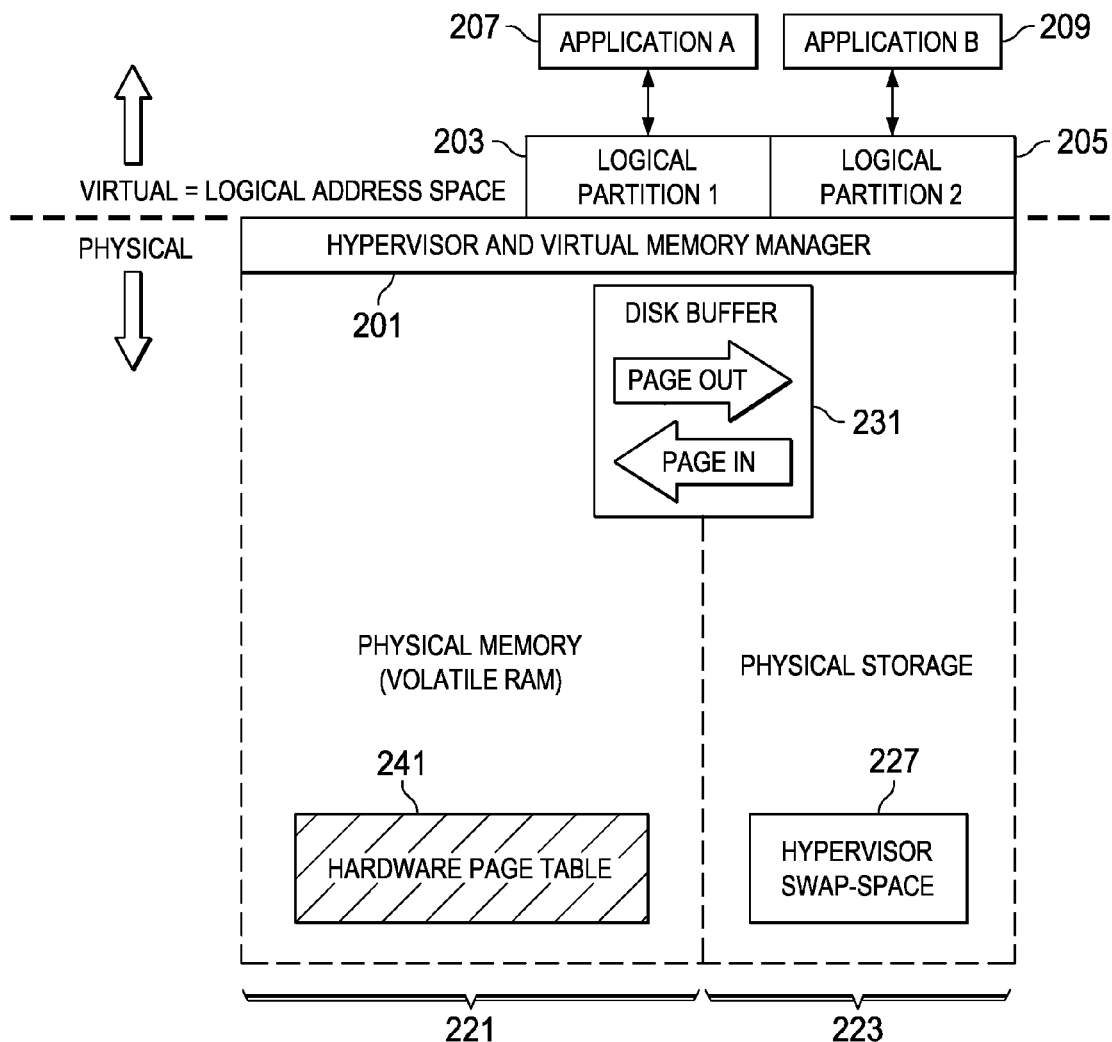
FIG. 2 is a logical arrangement of software modules using memory in accordance with an illustrative embodiment of the invention.

FIG. 2 is a logical arrangement of software modules using memory in accordance with an illustrative embodiment of the invention. Hypervisor 201 assigns resources to logical partitions, for example, logical partition 1 203, and logical partition 2 205. Each logical partition, in turn, may further allocate physical resources to application A 207 and application B 209. Among the resources allocated is physical memory. The allocation, use and reuse of physical memory are regulated by a virtual memory manager. An operating system is a logical partition.

A virtual memory manager is configured to provide access to data stored in one of the two classes of workspace to operating systems and applications. A virtual memory manager can be a part of a hypervisor 201. The hypervisor can determine how to handle situations when the occupied space of the physical memory 221 is either full, or reaches a preset threshold. An ideal situation involves the hypervisor placing in physical memory 221 each virtual memory page in advance of a processor operating on such virtual memory page. In practice, though, a processor may require such a virtual memory page before the virtual memory page is placed into physical memory 221. Physical memory is memory that stores charges or electromagnetic radiation by either continuously or nearly continuously applying power to circuits or other structures to maintain such charges or electromagnetic radiation. Physical memory includes, for example, random access memory (RAM).

Nevertheless, the data may be available, albeit in a slower form of storage than in physical memory 221. As explained above, physical storage 223, sometimes called paging space, is a second class of workspace. Physical storage operates on a slower basis than physical memory 221. Consequently, virtual memory pages resident in physical storage 223 are 'paged-in' through an I/O buffer, for example, disk buffer 231. Such paging-in is action where the virtual memory manager copies data from physical storage 223 to physical memory 221. Physical storage is a data storage structure that does not rely on the routine application of power to maintain storage elements. This feature is apparent, for example, in the magnetic domains of hard disk drives, or in the pits and other physical changes made to optical media. When the virtual memory page is paged-in, one or more clusters or other storage units in physical storage are accessed. Accordingly, data may arrive from the disk buffer in multiple stages, as, for example, when a disk read/write head is moved to successive tracks of the applicable media. When data arrives at a processor in this manner, the process of accessing such data is many times slower than accessing data that already exists in physical memory without the need to resort to block storage device access (or paging-in).

Physical storage can be subdivided depending on whether storage is allocated to a logical partition or whether storage is dynamically allocated by the hypervisor to provide backing stores to physical memory pages. In the first case, physical storage is subdivided and allocated such that each portion of physical storage is dedicated to one logical partition. In the second case, physical storage is provided by the hypervisor on a dynamic basis as backing stores to virtual memory pages stolen from a logical partition. The second form of storage allocation relies on a backing store known as a hypervisor swap-space, such as hypervisor swap-space 227 shown in FIG. 2. Hypervisor swap-space 227, rather than being dedicated to a logical partition, can be overwritten rapidly. Accordingly, hypervisor swap-space is physical storage that the hypervisor reserves to provide a backing store for over-committed memory. For example, the hypervisor may copy data from multiple logical partitions in rapid succession to the hypervisor swap-space.

In addition, to make adequate space for a virtual memory page to be made resident in physical memory 221, hypervisor 201 may page-out a virtual memory page already present in physical memory 221. One of several algorithms can accomplish selection of pages to page-out, or replacement pages. Such algorithms may be computer instructions executing on a processor, for example, processor 106, from FIG. 1. The quality or efficiency of the replacement algorithm can be measured based on the frequency with which a data processing system requires such replacement pages to be placed in physical memory 221, or 'paged-in' from physical storage 223. Such page replacement computer instructions may implement algorithms such as, for example, not recently used algorithm, first-in-first-out algorithm, second-chance algorithm, not frequently used algorithm, and least recently used algorithm, among others.

Each replacement paging algorithm, mentioned above, is organized to match one or more underlying assumptions concerning which pages in physical memory are likely to be reused and, if so, how heavily. For example, designers that implement a least recently used (LRU) page replacement algorithm assume that virtual memory pages that have been used frequently during a previous period of execution are virtual memory pages that are more likely to be reused in a next period of execution. Such an assumption compares and/or sorts virtual memory pages according to frequency of use, and may page-out the least used pages first.

The LRU page replacement algorithm can weigh more heavily a recent use of a virtual memory page, as compared to a use of a virtual memory page during an oldest sub-period of a measurement period. Accordingly, two recent accesses of a virtual memory page may be more heavily weighted than three less recent accesses of a second virtual memory page. Under such an implementation, a number is assigned to the second "less recent accesses" virtual memory page and a higher number is assigned to the first "recent accesses" virtual memory page. Virtual memory pages with the lowest associated number can be the first candidates for page replacement.

It is appreciated that generally, there are many page replacement algorithms to pick from, and particularly, that the LRU page replacement algorithm may have many suitable implementations.

The arrangement can provide a virtual address space that is substantially smaller than the physical address space. This variance in address space sizing may be due to limitations of the operating system that relies on virtualized memory. Hardware page table 241 can provide translations of addresses from the virtual domain to the physical domain, as well as vice-a-versa. A hardware page table is a table that operates under the control of a virtual memory manager to translate addresses from the logical address space to the physical address space.

Figure 3:
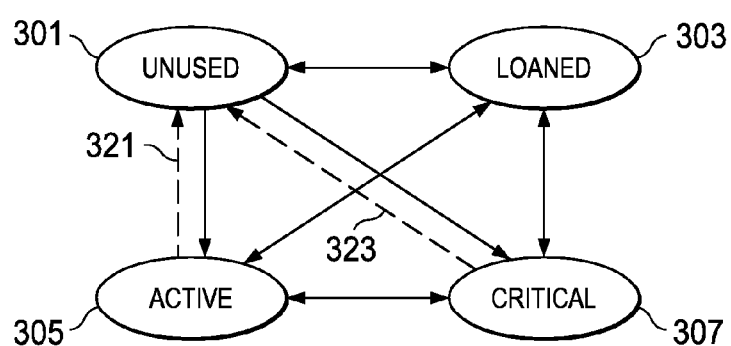
FIG. 3 is a state diagram applicable to a virtual memory page in a cooperative memory over-commitment (CMO) system in accordance with an illustrative embodiment of the invention.

FIG. 3 is a state diagram applicable to a virtual memory page in a cooperative memory over-commitment (CMO) system in accordance with an illustrative embodiment of the invention. Within a CMO system, the hypervisor allocates memory pages to two or more operating systems. Each operating system can have varying levels of reliance upon pages so allocated. The level to which an operating system relies on a page can vary according to the predicted delays that might occur to the operating system if such a page were to be recalled by the hypervisor for other use. Such delays may be predicted or estimated based on patterns of memory usage formed by the one or more applications that run on the operating system, as well as the usage of the operating system itself. Accordingly, each operating system may provide a hypervisor with periodic hints concerning the current reliance of the operating system upon a virtual memory page. A hint is a revision to, or a confirmation of, a state of a virtual memory page made by an operating system of logical partition to a hypervisor. A hint can be considered 'marking' a virtual memory page. A hint may be implemented by a call made from the operating system to the corresponding hypervisor to indicate the present state of a virtual memory page.

Some hints of the operating system's status vis-à-vis a virtual memory page include, 'unused' 301, 'loaned' 303, 'active' 305, and 'critical' 307. Accordingly, upon receiving each of these hints, the hypervisor tracks the page state and modifies the hypervisor's behavior with respect to the virtual memory page. It is understood that each state can be dynamic and that the virtual memory page can transition between states several times a second. 'Unused' 301 signals that the applicable virtual memory page is not needed by the operating system according to current conditions that the operating system encounters with one or more applications. 'Loaned' 303 signals that the corresponding virtual memory page is unused. Consequently, 'loaned' is a kind of 'unused' state. When an operating system marks a virtual memory page as 'loaned', then the operating system indicates it is reliant upon the virtual memory page the least as compared to other virtual memory stages that are not marked 'loaned'. Consequently, a virtual memory page state of 'loaned' indicates that if the hypervisor were to re-allocate the virtual memory page, the operating system predicts that the performance impact would be minimal as compared to the other states, explained further below. As a result, the hypervisor may re-allocate the virtual memory page to other operating systems resident on the data processing system. The hypervisor may coordinate with additional operating systems such that the number of virtual memory pages loaned in this manner is restored to the loaning operating system on a prioritized basis.

'Active' state 305 signals that the virtual memory page is in use by the operating system. Any unavailability of the virtual memory page within physical memory is predicted to cause a greater impact to the operating system than a spontaneous loss from physical memory of a 'loaned' 303 page. Finally, 'critical' 307 signals that the associated virtual memory page is in use by the operating system, and that loss of the virtual memory page is predicted to result in a still higher impact in operating system performance, as compared with a predicted impact associated with a loss of an 'active' 305 page. One risk, or performance impact, associated with marking a virtual memory page 'unused' is that during an interval prior to the operating system marking the virtual memory page 'active' 305, the hypervisor can page-in data for a second operating system to the page. If the first operating system hints 'active' 305 within a short interval of the 'unused' marking, then the first operating system can suffer delays. The delays are associated with the initial paging-in of the virtual memory page for the second operating system, as well as the delay associated with the subsequent paging-out of the virtual memory page. The hypervisor may re-allocate virtual memory pages of the operating system on a priority basis. In other words, the hypervisor may be configured to first exhaust all virtual memory pages marked loaned by the operating system. Similarly, the hypervisor may exhaust all loaned virtual memory pages, followed by the unused virtual memory pages, and lastly, by the critical virtual memory pages. Such re-allocated virtual memory pages may be re-purposed to support operations by other operating systems or logical partitions present in the data processing system.

A virtual memory page may transition among the various states. Some state transitions are regulated and, in some cases, inhibited by one or more illustrative embodiments. These transitions include transition 321 and transition 323. These transitions are the transitions from 'active' to 'unused', and from 'critical' to 'unused', respectively.

Figure 4:
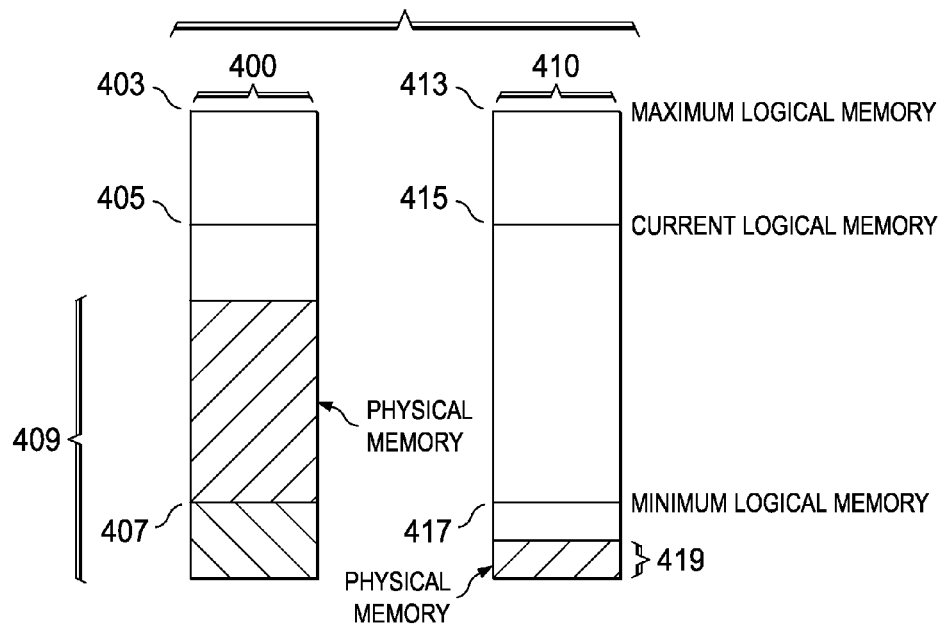
FIG. 4 shows in two charts how physical memory can be committed to a logical partition in a cooperative memory over-commitment supporting data processing system in accordance with an illustrative embodiment of the invention.

FIG. 4 shows in two charts how physical memory can be committed to a logical partition or operating system in a cooperative memory over-commitment supporting data processing system in accordance with an illustrative embodiment of the invention. A logical partition or operating system that supports CMO is said to support virtual real memory (VRM). Thus, with VRM support, a logical partition's logical memory will effectively be divided into virtual memory pages, and the hypervisor maps each virtual memory page to physical memory or to storage.

At a first time, a logical partition is allocated memory according to chart 400. At a second time, the logical partition is allocated memory according to chart 410. At each time, the logical partition may be allocated a maximum logical memory, respectively, maximum logical memory 403 and maximum logical memory 413. Maximum logical memory is the amount of memory available for the hypervisor to allocate, and corresponds to a size of the combined physical memory and physical storage. Current logical memory is the sum of the virtual memory pages allocated to a logical partition, and includes, for example, current logical memory 405 and current logical memory 415. Minimum logical memory is the smallest logical memory that is configured for the partition, as shown by minimum logical memory 407 and minimum logical memory 417. The minimum and maximum values are constraints on a partition's logical address space as configured by a system administrator, based on the expected usage of the partition.

Accordingly, the physical memory that backs the virtual memory pages of the operating system may dynamically change from physical memory 409 at the first time, to physical memory 419 at the second time. The balance of the physical workspace allocated to the operating system in each time is the difference between the current logical memory and the physical memory. The hypervisor may supply physical storage in, for example, a disk drive as a place for this balance of virtual memory pages to reside. Thus, the memory size of a logical partition is a virtual memory size, referred to as the partition's "logical" memory size. Because a logical partition's logical memory is virtualized, the sum of all of the logical partitions' logical memory sizes can be much larger than the amount of physical memory in the data processing system. The hypervisor handles this over-commitment of physical memory by paging out partitions' logical memory pages to paging space.

Cooperative memory over-commitment is the allocating of less physical memory to each of two or more logical partitions than the hypervisor provides in virtual memory pages, as well as providing a hierarchical manner for the hypervisor to sort physical memory markings in order to select virtual memory pages to steal from one operating system.

FIG. 5A is a flowchart of steps of an operating system to mark a virtual memory page as critical in accordance with an illustrative embodiment of the invention. Initially, the operating system selects a virtual memory page for paging-out to disk (step 501). A virtual memory page selected for paging-out to disk is a virtual memory page identified by the operating system or an application running on the operating system in preparation to place data from memory to physical storage. The operating system can perform this step, for example, in response to a computer instruction to synchronize an edited document in memory with physical storage. Alternatively, the operating system may perform this step by changing a translation associated with the virtual memory page in a hardware page table. The operating system may determine whether the data processing system is using a cooperative memory over-commitment (step 503).

If the operating system determines that the data processing system is using a cooperative over-commitment, the operating system marks the virtual memory page as 'critical' (step 505). Step 505 may include the virtual memory manager copying the virtual memory page to physical memory. This step can be responsive to the virtual memory page being physically located in storage. Next, or if the determination of step 503 is negative, the operating system moves the virtual memory page to a 'page-out' state (step 507). If the virtual memory page is in a page-out state, it is protected from access by the application. In other words, the operating system alone may access the page until the data of the page is completely copied to physical storage. The operating system may set states for a logical page to indicate a page-out state or three alternative states, such as free state, in-use state, or page-in state. Attendant with step 507, the operating system may flush the virtual memory page out to a disk. As such, the flush operation may be completed when all bits of the applicable virtual memory page are copied to disk. The disk can be, for example, hard disk drive 126 of FIG. 1. Alternatively, the disk can be a solid-state disk, optical disk, or any other form of block storage device. Next, the operating system may finish the paging-out of the virtual memory page (step 509). Step 509 may include finishing flushing the data of the virtual memory page to disk. Next, the operating system marks the virtual memory page as 'active' (step 511). Processing terminates thereafter.

Figure 5B:
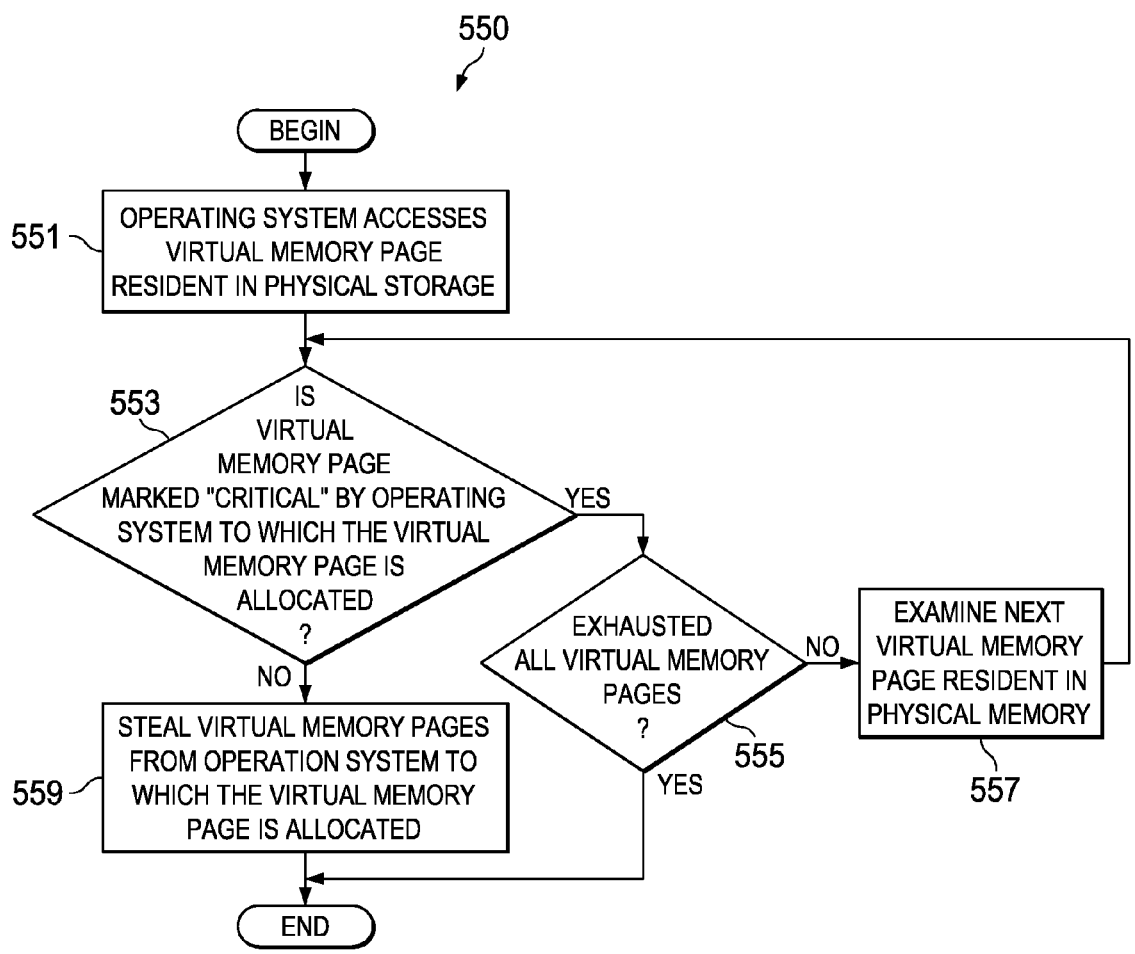
FIG. 5B is a flowchart of steps of a virtual memory manager to select a virtual memory page for stealing from an operating system in accordance with an illustrative embodiment of the invention.

FIG. 5B is a flowchart of steps of a virtual memory manager to select a virtual memory page for stealing from an operating system in accordance with an illustrative embodiment of the invention. The flowchart depicts steps taken by a virtual memory manager to steal a physical memory page to satisfy a requirement of a first operating system. These steps are at the expense of moving data of a second operating system out of the physical memory in a process known as paging-out. Initially, an operating system requests or accesses a virtual memory page that is a resident in physical storage (step 551). Next, the virtual memory manager determines whether the virtual memory page is marked 'critical' by an operating system (OS) to which the virtual memory page is allocated (step 553). If the virtual memory page is marked critical, the virtual memory manager determines if all virtual memory pages in memory have been exhausted (step 555). That is, the virtual memory manager determines a positive outcome to step 555 if all virtual memory pages in physical memory have been determined to be 'critical'. Processing terminates thereafter.

If there are further pages in memory not yet determined to be 'critical' with respect to process 550, the virtual memory manager examines a next virtual memory page resident in physical memory (step 557). Next, the virtual memory manager repeats step 553, with respect to the next virtual memory page resident to physical memory.

A negative outcome to step 553, leads the virtual memory manager to steal the current virtual memory page from the operating system to which the virtual memory page is allocated (step 559). Accordingly, the physical page that holds the virtual memory page is paged out to the physical storage, also known as backing store. In addition, step 559 may include the virtual memory manager reassigning the physical page to a different logical address. Processing terminates after step 559, or after all pages are determined to be exhausted at step 555.

Thus, contemporaneously with, or shortly after a determination that a virtual memory page is selected to be paged-out by an operating system, the operating system in cooperation with a virtual memory manager may elevate the affected virtual memory page to 'critical' status. Accordingly, the cooperative operation of the virtual memory manager and operating system may avoid paging-out the virtual memory page to the hypervisor swap-space ahead of the initiation of the operating system paging-out the virtual memory page.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for marking as critical a virtual memory page in a data processing system, the method comprising:
   indicating to a virtual memory manager a virtual memory page selected for paging-out to disk;
   determining that the data processing system is using a cooperative memory over-commitment;
   responsive to a determination that the data processing system is using cooperative memory over-commitment, marking the virtual memory page as critical, such that the virtual memory page remains in physical memory; and
   responsive to marking the virtual memory page as critical, setting the virtual memory page to a page-out state.

2. The computer implemented method of claim 1, wherein the step of setting the memory page to a page-out state further comprises:
   flushing the virtual memory page out to a disk.

3. The computer implemented method of claim 2, wherein the step of flushing is performed by computer program instructions that comprise an operating system.

4. The computer implemented method of claim 2, further comprising:
   finishing flushing the virtual memory page out to the disk; and
   responsive to finishing flushing the virtual memory page out to the disk, marking the virtual memory page as active.

5. The computer implemented method of claim 1, wherein the step of indicating further comprises:
   changing a translation associated with the virtual memory page in a hardware page table.

6. The computer implemented method of claim 1, wherein the virtual memory page is physically located in storage, the step of marking further comprising:
   responsive to marking the virtual memory page as critical, copying the virtual memory page to physical memory.

7. The computer implemented method of claim 6, wherein the step of setting the virtual memory page to a page-out state further comprises:

finishing flushing the virtual memory page out to the disk; and marking the virtual memory page as active in the hardware page table in response to finishing flushing the virtual memory page out to the disk.

8. A data processing system comprising:

a bus;

a storage device connected to the bus, wherein computer usable code is located in the storage device;

a communication unit connected to the bus; and a processing unit connected to the bus, wherein the processing unit executes the computer usable code for marking as critical a virtual memory page in a data processing system, wherein the processing unit executes the computer usable program code to indicate to a virtual memory manager a virtual memory page selected for paging-out to disk; determine that the data processing system is using a cooperative memory over-commitment; mark the virtual memory page as critical, such that the virtual memory page remains in physical memory responsive to a determination that the data processing system is using cooperative memory over-commitment; and set the virtual memory page to a page-out state responsive to marking the virtual memory page as critical.

9. The data processing system of claim 8, wherein in executing computer usable code to set the memory page to a page-out state, the processor executes computer usable code to flush the virtual memory page out to a disk.

10. The data processing system of claim 9, wherein processor executed computer usable code to flush is performed by computer program instructions that comprise an operating system.

11. The data processing system of claim 9, wherein the processor further executes computer usable code to finish flushing the virtual memory page out to the disk and mark the virtual memory page as active responsive to finishing flushing the virtual memory page out to the disk.

12. The data processing system of claim 8, wherein in executing computer usable code to indicate, the processor executes computer usable code to change a translation associated with the virtual memory page in a hardware page table.

13. The data processing system of claim 8, wherein the virtual memory page is physically located in storage, wherein in executing computer usable code to mark, the processor executes computer usable program code to copy the virtual memory page to physical memory.

14. The data processing system of claim 13, wherein in executing computer usable code to set the virtual memory page to a page-out state, the processor executes computer usable code to mark the virtual memory page as active in the hardware page table.

15. A computer program product for marking as critical a virtual memory page in a data processing system, the computer program product comprising:

one or more computer-readable, tangible storage devices;

program instructions, stored on at least one of the one or more tangible storage devices, to indicate to a virtual memory manager a virtual memory page selected for paging-out to disk;

program instructions, stored on at least one of the one or more tangible storage devices, to determine that the data processing system is using a cooperative memory over-commitment;

program instructions, stored on at least one of the one or more tangible storage devices, to mark the virtual memory page as critical, such that the virtual memory page remains in physical memory responsive to a determination that the data processing system is using cooperative memory over-commitment; and program instructions, stored on at least one of the one or more tangible storage devices, to set the virtual memory page to a page-out state responsive to marking the virtual memory page as critical.

16. The computer program product of claim 15, wherein the program instructions, stored on at least one of the one or more tangible storage devices, to set the memory page to a page-out state further comprises:

program instructions, stored on at least one of the one or more tangible storage devices, to flush the virtual memory page out to a disk.

17. The computer program product of claim 16, wherein the program instructions, stored on at least one of the one or more tangible storage devices, to flush is performed by computer program instructions that comprise an operating system.

18. The computer program product of claim 16, further comprising:

program instructions, stored on at least one of the one or more tangible storage devices, to finish flushing the virtual memory page out to the disk; and program instructions, stored on at least one of the one or more tangible storage devices, to mark the virtual memory page as active responsive to finishing flushing the virtual memory page out to the disk.

19. The computer program product of claim 15, wherein the program instructions, stored on at least one of the one or more tangible storage devices, to indicate further comprises:

program instructions, stored on at least one of the one or more tangible storage devices, to change a translation associated with the virtual memory page in a hardware page table.

20. The computer program product of claim 15, wherein the virtual memory page is physically located in storage, the program instructions, stored on at least one of the one or more tangible storage devices, to mark further comprising:

program instructions, stored on at least one of the one or more tangible storage devices, to copy the virtual memory page to physical memory.

21. The computer program product of claim 20, wherein the program instructions, stored on at least one of the one or more tangible storage devices, to set the virtual memory page to a page-out state further comprises:

program instructions, stored on at least one of the one or more tangible storage devices, to mark the virtual memory page as active in the hardware page table.

* * * * *